United States Patent
Youtz et al.

(10) Patent No.: US 10,602,523 B2
(45) Date of Patent: Mar. 24, 2020

(54) ALLOCATION OF NETWORK RESOURCES BASED ON ANTENNA INFORMATION AND/OR DEVICE TYPE INFORMATION

(71) Applicant: Verizon Patent and Licensing Inc., Arlington, VA (US)

(72) Inventors: Andrew E. Youtz, Princeton, NJ (US); Lily Zhu, Parsippany, NJ (US); Jignesh S. Panchal, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 123 days.

(21) Appl. No.: 15/388,527

(22) Filed: Dec. 22, 2016

(65) Prior Publication Data
US 2018/0184412 A1 Jun. 28, 2018

(51) Int. Cl.
*H04W 72/04* (2009.01)
*H04W 28/18* (2009.01)

(52) U.S. Cl.
CPC ......... *H04W 72/048* (2013.01); *H04W 28/18* (2013.01)

(58) Field of Classification Search
None
See application file for complete search history.

(56) References Cited

U.S. PATENT DOCUMENTS

| | | | | |
|---|---|---|---|---|
| 6,167,261 | A * | 12/2000 | Amin | H04W 8/20 455/403 |
| 6,745,221 | B1 * | 6/2004 | Ronca | H04M 3/50 370/231 |
| 9,219,592 | B1 * | 12/2015 | Nichols | H04W 72/04 |
| 2002/0128038 | A1 * | 9/2002 | De Loye | H04W 84/16 455/554.1 |
| 2004/0054916 | A1 * | 3/2004 | Foster | G06F 21/6218 726/5 |
| 2006/0034221 | A1 * | 2/2006 | Karaoguz | H04W 16/14 370/330 |
| 2009/0002235 | A1 * | 1/2009 | Ito | H01Q 3/26 342/368 |
| 2009/0077256 | A1 * | 3/2009 | Madan | H04L 47/10 709/231 |
| 2009/0163158 | A1 * | 6/2009 | Chitrapu | H04W 52/146 455/127.5 |
| 2009/0312018 | A1 * | 12/2009 | Moulsley | H04B 7/04 455/435.1 |
| 2010/0100949 | A1 * | 4/2010 | Sonwane | H04L 63/102 726/7 |

(Continued)

*Primary Examiner* — Christopher T Wyllie

(57) ABSTRACT

A device may receive a request, from a user equipment (UE), to connect to a network. The device may receive antenna information indicating that the UE has a single antenna, and the device may receive device type information indicating a device type of the UE or network resource requirements associated with the UE. The device may obtain network policy information, relating to the UE, based on the antenna information and/or the device type information. The network policy information may indicate one or more policy rules associated with allocating network resources. The device may determine a quantity of network resources to allocate based on the network policy information, and the device may allocate the quantity of network resources for the UE.

20 Claims, 5 Drawing Sheets

(56) References Cited

U.S. PATENT DOCUMENTS

| | | | |
|---|---|---|---|
| 2010/0118793 A1* | 5/2010 | Horn | H04W 72/042 370/329 |
| 2010/0118794 A1* | 5/2010 | Horn | H04W 72/042 370/329 |
| 2010/0198698 A1* | 8/2010 | Raleigh | G06Q 30/0601 705/26.1 |
| 2010/0246390 A1* | 9/2010 | Wu | H04L 1/1887 370/230 |
| 2010/0246561 A1* | 9/2010 | Shin | H04W 52/32 370/345 |
| 2011/0007706 A1* | 1/2011 | Shaikh | H04W 28/16 370/331 |
| 2011/0081875 A1* | 4/2011 | Imamura | H04B 1/04 455/101 |
| 2011/0102157 A1* | 5/2011 | Tarkoma | H04W 52/0229 340/10.33 |
| 2011/0200004 A1* | 8/2011 | Nakashima | H04J 13/0062 370/330 |
| 2011/0205916 A1* | 8/2011 | Dinan | H04L 43/024 370/252 |
| 2011/0271168 A1* | 11/2011 | Han | H04L 1/0027 714/807 |
| 2011/0287776 A1* | 11/2011 | Vujcic | H04W 72/048 455/452.1 |
| 2012/0002614 A1* | 1/2012 | Ekici | H04W 48/18 370/329 |
| 2012/0042065 A1* | 2/2012 | Takahashi | G06F 3/1203 709/224 |
| 2012/0093120 A1* | 4/2012 | Ko | H04B 7/0671 370/329 |
| 2012/0270545 A1* | 10/2012 | Zhao | H04W 72/00 455/435.1 |
| 2013/0225094 A1* | 8/2013 | Mujtaba | H04W 52/0245 455/73 |
| 2014/0040975 A1* | 2/2014 | Raleigh | H04W 12/12 726/1 |
| 2014/0075029 A1* | 3/2014 | Lipchuk | G06F 9/505 709/226 |
| 2014/0256336 A1* | 9/2014 | Manssour | H04L 1/0026 455/450 |
| 2014/0282829 A1* | 9/2014 | Dabbiere | H04L 63/10 726/1 |
| 2015/0049606 A1* | 2/2015 | So | H04L 47/808 370/230 |
| 2015/0296499 A1* | 10/2015 | Huang | H04W 72/048 370/329 |
| 2015/0373737 A1* | 12/2015 | Park | H04L 1/16 370/329 |
| 2016/0081073 A1* | 3/2016 | Lindoff | H04W 72/1215 370/329 |
| 2017/0147227 A1* | 5/2017 | Stabrawa | G06F 3/0608 |
| 2018/0184412 A1* | 6/2018 | Youtz | H04W 72/048 |

* cited by examiner

ALLOCATION OF NETWORK RESOURCES BASED ON ANTENNA INFORMATION AND/OR DEVICE TYPE INFORMATION

BACKGROUND

An increasing number of long term evolution (LTE) devices are single antenna devices. For example, some devices can support only a single antenna due to size constraints of the devices (e.g., small wearable devices). Additionally, some devices are designed with a single antenna due to cost concerns (e.g., a device such as an electric meter may not need two antennas, and designing the electric meter with one antenna may cut costs). Furthermore, other devices use primarily uplink resources (e.g., a surveillance camera that streams data up to a cloud) and, as a result, do not require more than one downlink antenna.

DETAILED DESCRIPTION OF PREFERRED EMBODIMENTS

The following detailed description of example implementations refers to the accompanying drawings. The same reference numbers in different drawings may identify the same or similar elements.

For category (CAT) 1 LTE devices and higher, the Third Generation Partnership Project (3GPP) specification defines procedures for dual antenna devices. As a result, a base station (e.g., an evolved Node B (eNB)) may be configured to treat a CAT 1 or higher user equipment (UE) as a dual antenna device. This may cause problems when a base station, communicating with a UE, has to make network resource allocation decisions. For example, CAT 1 or higher devices may be either single antenna UEs or dual antenna UEs, and the base station may be configured to allocate roughly the same amount of network resources to a single antenna UE as a dual antenna UE.

However, if single antenna UEs have less efficient network resource usage (e.g., less spectral efficiency) than dual antenna UEs (e.g., require more network resources to receive the same number of information bits as compared to dual antenna UEs), then a base station may inefficiently allocate network resources to these CAT 1 or higher devices (e.g., by allocating too many network resources to single antenna UEs, and therefore allocating too few network resources to dual antenna UEs). This may waste network resources (e.g., by allocating too many network resources to a particular device), cause unfair allocation of network resources, cause handover (HO) failures (e.g., by allocating too few network resources to a particular device), increase the number of lost connections or dropped calls (e.g., by allocating too few network resources to a particular device), or the like.

Implementations described herein provide one or more network devices with UE antenna information that may be used to create network resource allocation policies and may be further used to generate network resource allocation schedules based on the policies. Additionally, or alternatively, the one or more network devices may be provided with UE device type information that may be used to create network resource allocation policies and schedules (e.g., information indicating the type of device associated with a UE, such as a wearable device type or an internet of things (IoT) device type).

By receiving antenna information and/or device type information, a base station is able to make more intelligent network resource allocation decisions, which conserves network resources by scheduling UEs with resources that are comparable to the particular UE device type. In addition, intelligent network resource scheduling decisions improve user satisfaction and network resource usage by decreasing dropped calls, decreasing handover failures, or the like.

Figure 1A:
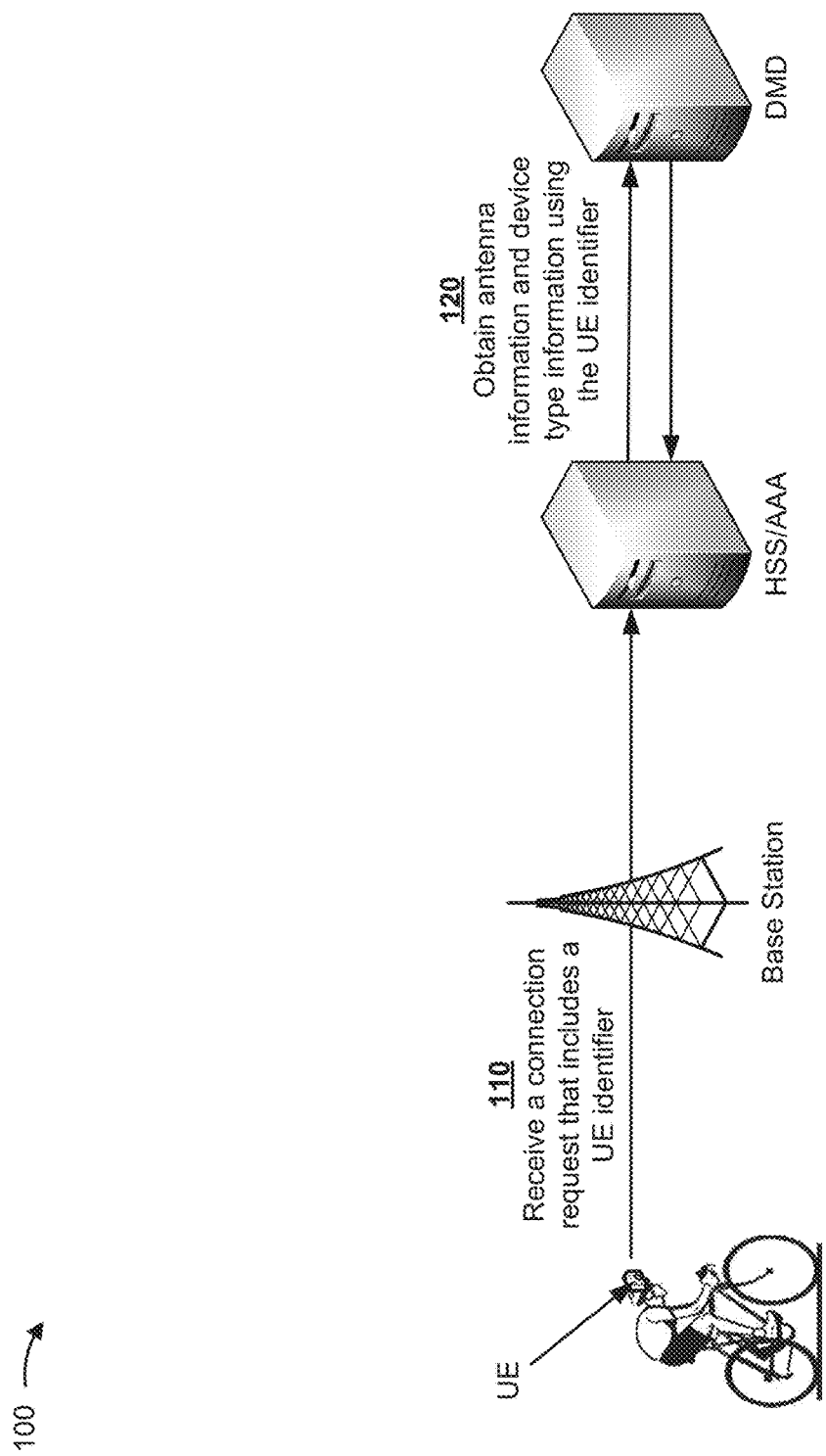
FIGS. 1A and 1B are diagrams of an overview of an example implementation described herein.
Figure 1B:
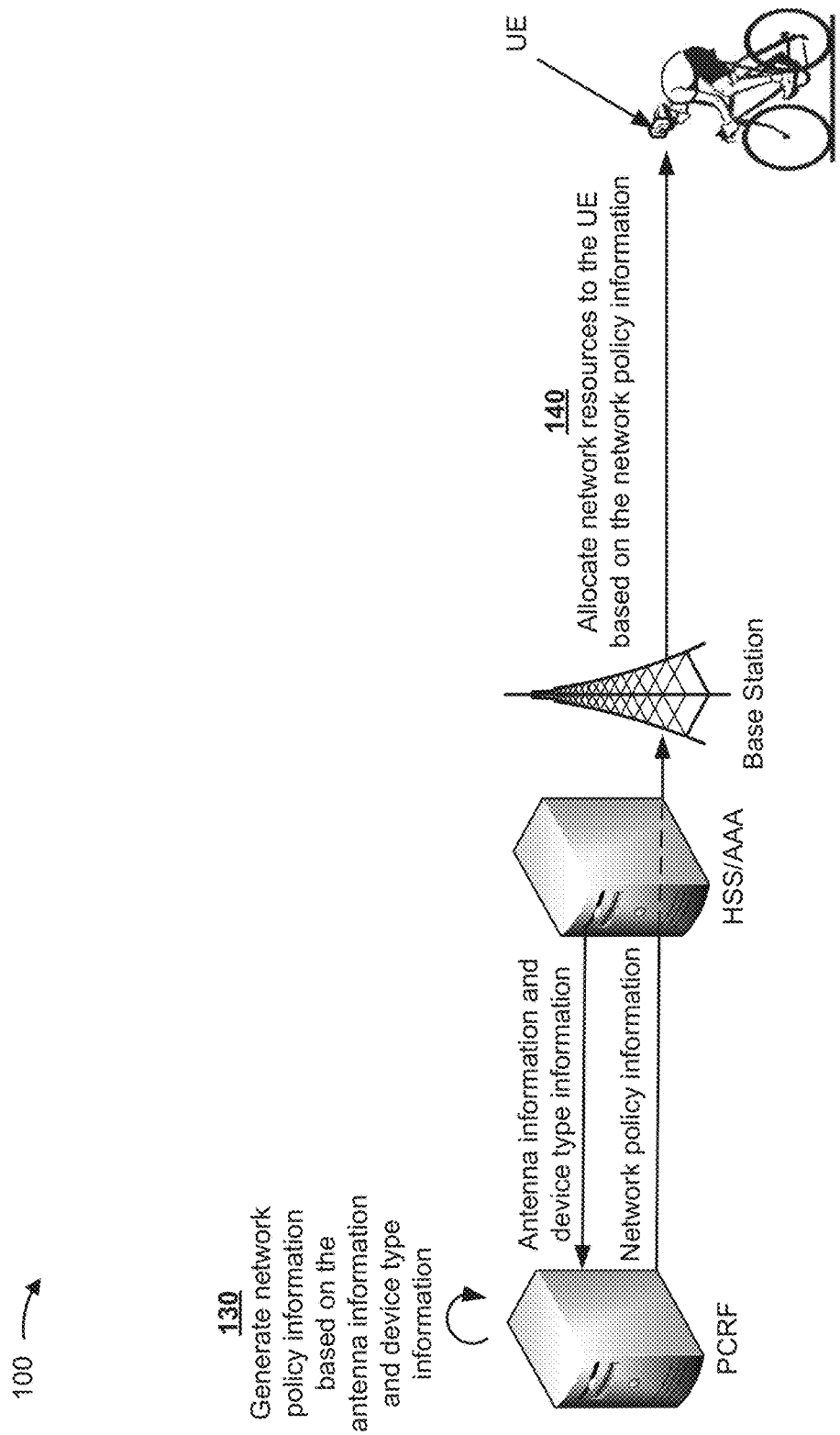

FIGS. 1A and 1B are diagrams of an overview of an example implementation 100 described herein. As shown in FIG. 1A, and by reference number 110, a base station may receive a connection request that includes a UE identifier associated with a UE such as a wearable camera. For example, the UE identifier may be an international mobile equipment identifier (IMEI), and may be sent via a radio resource control (RRC) capabilities exchange during the connection request. As shown by reference number 120, a home subscriber server/authentication authorization and accounting server (HSS/AAA) may obtain antenna information and device type information using the UE identifier. Here, the HSS/AAA may use the IMEI of the UE to access antenna information and device type information in a device management database (DMD). The antenna information may indicate that the UE is a single antenna device. The device type information may indicate that the UE is a wearable camera, and this particular type of wearable camera may be associated with using large quantities of uplink resources and small quantities of downlink resources (e.g., due to the wearable camera being used primarily for uplink streaming).

As shown in FIG. 1B, a policy and charging rules function server (PCRF) may obtain antenna information and device type information from the HSS/AAA. As shown by reference number 130, the PCRF may generate network policy information based on the antenna information and the device type information. The PCRF may send the network policy information back to HSS/AAA, which may send the network policy information to the base station. In this case, the network policy information may include one or more rules relating to the allocation of network resources, and the one or more rules may be associated with the UE being a single antenna device and a wearable camera. As an example, the PCRF may send a policy rule that reduces the quantity of downlink resources available for the UE (e.g., a wearable camera is likely to use a large quantity of uplink resources which may result in the PCRF issuing a policy rule that reduces the quantity of available downlink resources).

As shown by reference number 140, the base station may allocate network resources to the UE based on the network policy information. As an example, a scheduler, of the base station, may use the network policy information to allocate fewer downlink resources to the UE than a typical dual antenna device. By allocating network resources that are comparable to the specific resource needs of the UE (e.g., by allocating just enough resources to satisfy the specific needs of the wearable camera), the base station more effectively allocates overall network resources and increases network capacity.

As indicated above, FIGS. 1A and 1B are provided merely as an example. Other examples are possible and may differ from what was described with regard to FIGS. 1A and 1B. For example, the base station may use the network policy information to allocate network resources for tens, hundreds, or even thousands of UEs.

Figure 2:
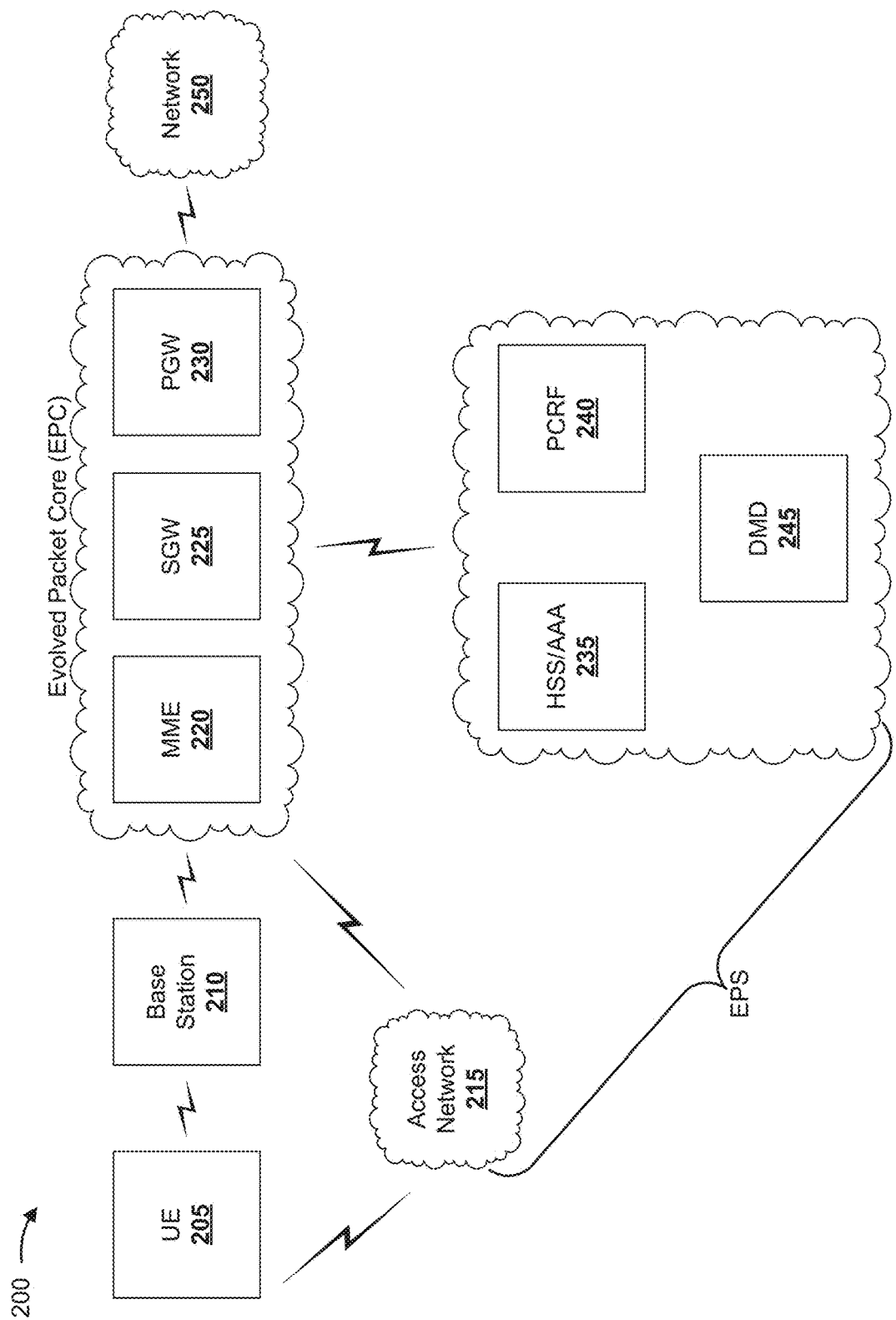
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a UE 205, a base station 210, an access network 215, a mobility management entity (MME) 220, a serving gateway (SGW) 225, a packet data network (PDN) gateway (PGW) 230, a HSS/AAA 235, a PCRF 240, a DMD 245, and a network 250. Devices of environment 200 may interconnect via wired connections, wireless connections, or a combination of wired and wireless connections.

UE 205 includes one or more devices capable of communicating with base station 210 and/or a network (e.g., access network 215 and/or network 250). For example, UE 205 may include a wearable device (e.g., a camera, smart glasses, a fitness band, or a smart watch), an IoT device, a machine to machine (M2M) device, a wireless communication device, a video camera, and/or a similar single antenna device. UE 205 may transmit traffic to and/or receive traffic from base station 210. In some implementations, UE 205 may transmit to and/or receive traffic from base station 210 via a RRC capabilities exchange.

Base station 210 includes one or more devices capable of receiving, generating, processing, storing, and/or transmitting network traffic, such as media, audio, video, text, and/or other traffic, destined for and/or received from UE 205. For example, base station 210 may include a base transceiver station, a radio base station, a node B, an eNB, a base station subsystem, a cellular site, a cellular tower (e.g., a cell phone tower, a mobile phone tower, etc.), a radio access node, a macrocell base station, a microcell base station, a picocell base station, a femtocell base station, an access point, or a similar type of device. Base station 210 may transfer traffic between UE 205 and network 250 via an air interface. In some implementations, base station 210 may receive, from HSS/AAA 235 and/or PCRF 240, information identifying network policy information associated with UE 205.

Access network 215 includes one or more wired and/or wireless networks. For example, access network 215 may include a cellular network (e.g., a 5G network, an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks. In some implementations, access network 215 may allow UE 205 to access one or more services provided by the evolved packet core (EPC) and/or network 250.

MME 220 includes one or more network devices, such as one or more server devices, capable of managing authentication, activation, deactivation, and/or mobility functions associated with UE 205. In some implementations, MME 220 may perform operations relating to authentication of UE 205. Additionally, or alternatively, MME 220 may facilitate the selection of a particular SGW 225 and/or PGW 230 to serve traffic to and/or from UE 205. MME 220 may perform operations associated with handing off UE 205 from a first base station 210 to a second base station 210 when UE 205 is transitioning from a first cell associated with the first base station 210 to a second cell associated with the second base station 210. Additionally, or alternatively, MME 220 may select another MME (not pictured), to which UE 205 should be handed off (e.g., when UE 205 moves out of range of MME 220).

SGW 225 includes one or more network devices capable of routing network traffic. For example, SGW 225 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 225 may aggregate traffic received from one or more base stations 210, and may send the aggregated traffic to other network devices. SGW 225 may also receive traffic from other network devices, and may send the received traffic to UE 205 via base station 210.

PGW 230 includes one or more network devices capable of providing connectivity for UE 205 to external packet data networks. For example, PGW 230 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 230 may aggregate traffic received from one or more SGWs 225, and may send the aggregated traffic to network 250. Additionally, or alternatively, PGW 230 may receive traffic from network 250, and may send the traffic to UE 205 via SGW 225 and base station 210. PGW 230 may record data usage information (e.g., byte usage, packet usage, etc.), and may provide the data usage information to HSS/AAA 235.

HSS/AAA 235 includes one or more network devices, such as one or more server devices, capable of managing (e.g., receiving, generating, storing, processing, and/or providing) information associated with UE 205. For example, HSS/AAA 235 may manage information indicating the number of antennas associated with UE 205, information indicating a device type of UE 205 (e.g., a wearable device, an IoT device, a M2M device, etc.), information indicating the network resource requirements associated with UE 205, subscription information associated with UE 205, such as information that identifies a profile of a subscriber associated with UE 205, information that identifies network services and/or applications that are accessible to UE 205, location information associated with UE 205, a network identifier (e.g., a network address) that identifies UE 205, information that identifies a treatment of UE 205 (e.g., quality of service (QoS) information, a quantity of minutes allowed per time period, a quantity of data consumption allowed per time period, etc.), information that identifies whether UE 205 is associated with a radio frequency access signaling usage control policy and/or a radio frequency access signaling usage transaction policy, or the like. HSS/AAA 235 may provide this information to one or more other devices of environment 200 to support the operations performed by those devices.

Additionally, or alternatively, HSS/AAA 235 includes one or more devices, such as one or more server devices that perform authentication, authorization, and/or accounting operations for communication sessions associated with UE 205. For example, HSS/AAA 235 may perform authentication operations for a subscriber associated with UE 205 (e.g., using one or more credentials), may control access, by UE 205, to a service and/or an application (e.g., based on one or more restrictions, such as time-of-day restrictions, location restrictions, single or multiple access restrictions, read/write restrictions, etc.), may track resources used by UE 205 (e.g., a quantity of voice minutes used, a quantity of data used, a quantity of radio frequency signals transmitted, a quantity of radio access bearers requested and/or established, etc.), and/or may perform similar operations.

PCRF 240 includes one or more network devices, such as one or more server devices, capable of providing network policies and rules relating to antenna information and/or device type information. Policies and rules regarding antenna information and/or device type information may include policies and rules indicating network resource requirements associated with UEs 205 based on, for example, the number of antennas the UEs 205 have and/or the device types of the UEs 205. In addition, PCRF 240 may provide network control regarding service data flow detection, gating, QoS, and/or flow-based charging. Policies and rules regarding QoS may include policies and rules instructing UE 205 and/or network devices (e.g., base station 210, SGW 225, PGW 230, etc.) to minimize packet loss, to implement a packet delay budget, to provide a guaranteed bit rate (GBR), to provide a particular latency, to reduce radio frequency (RF) signal congestion, and/or to perform other activities associated with QoS. PCRF 240 may provide policies and rules to other network devices, such as base station 210, SGW 225, PGW 230, or the like, to implement network control. PCRF 240 may determine how a certain service data flow shall be treated, and may ensure that subscriber plane traffic mapping and QoS is in accordance with a subscriber's profile and/or network policies.

DMD 245 includes one or more network devices that gather, process, search, store, and/or provide information to other network devices (e.g., HSS/AAA 235, PCRF 240, etc.). For example, DMD 245 may include a database that stores information associated with UE 205 and/or other user devices, such as antenna information (e.g., a number of antennas, such as single antenna, dual antenna, etc.), device type information (e.g., a device type, such as a wearable device, an IoT device, an M2M device, or the like), information indicating network resource requirements associated with the number of antennas and/or the device type, and model information (e.g., model type information, model number information, model name information, screen form factors, etc.). In some implementations, DMD 245 may receive, from HSS/AAA 235, a DMD query (e.g., to determine antenna information associated with UE 205) based on a UE 205 identifier, and may compare the DMD query to the database of antenna information. Based on the query, DMD 245 may provide antenna information back to HSS/AAA 235.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
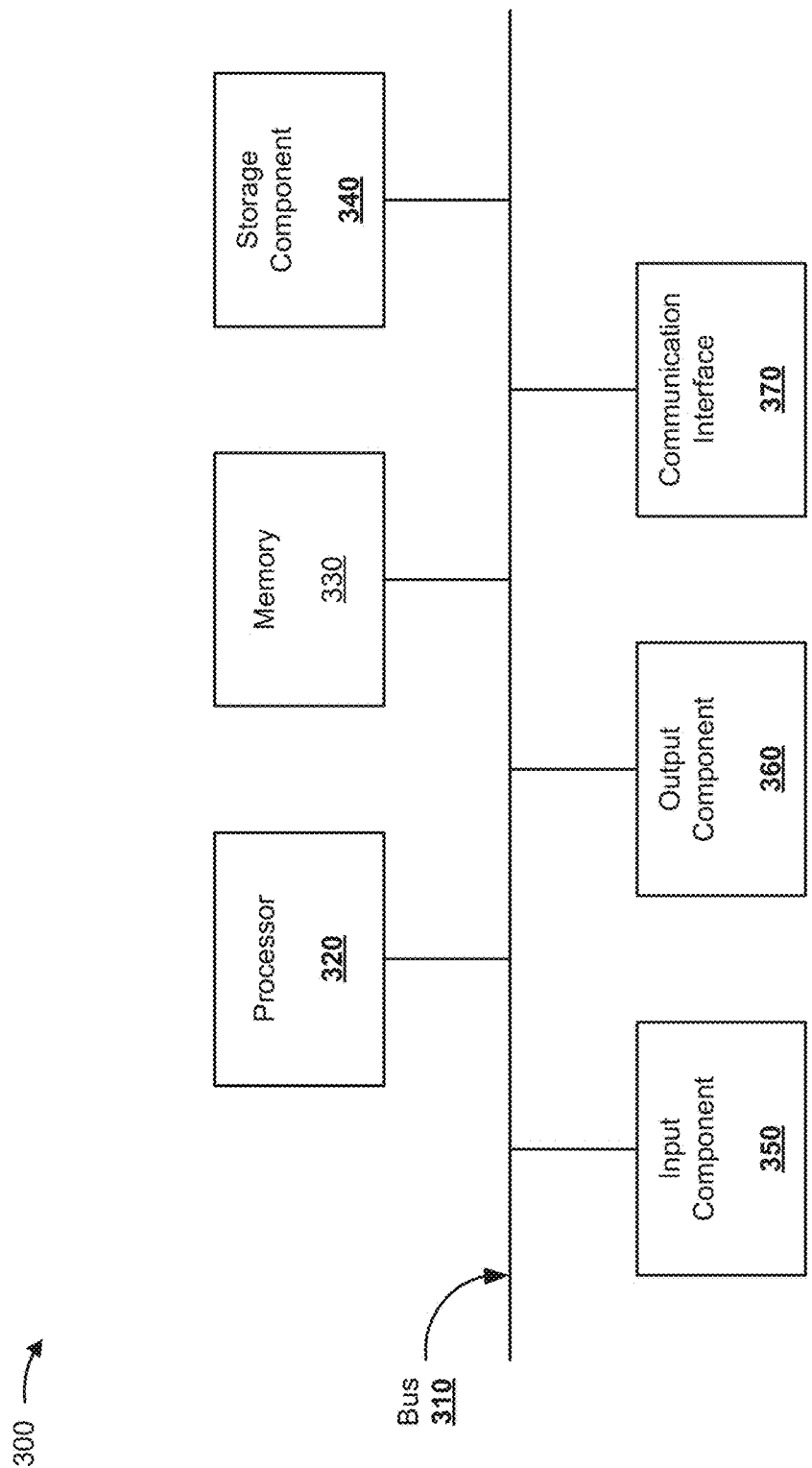
FIG. 3 is a diagram of example components of one or more devices of FIG. 2.

FIG. 3 is a diagram of example components of a device 300. Device 300 may correspond to UE 205, base station 210, MME 220, SGW 225, PGW 230, HSS/AAA 235, PCRF 240, and/or DMD 245. In some implementations, UE 205, base station 210, MME 220, SGW 225, PGW 230, HSS/AAA 235, PCRF 240, and/or DMD 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
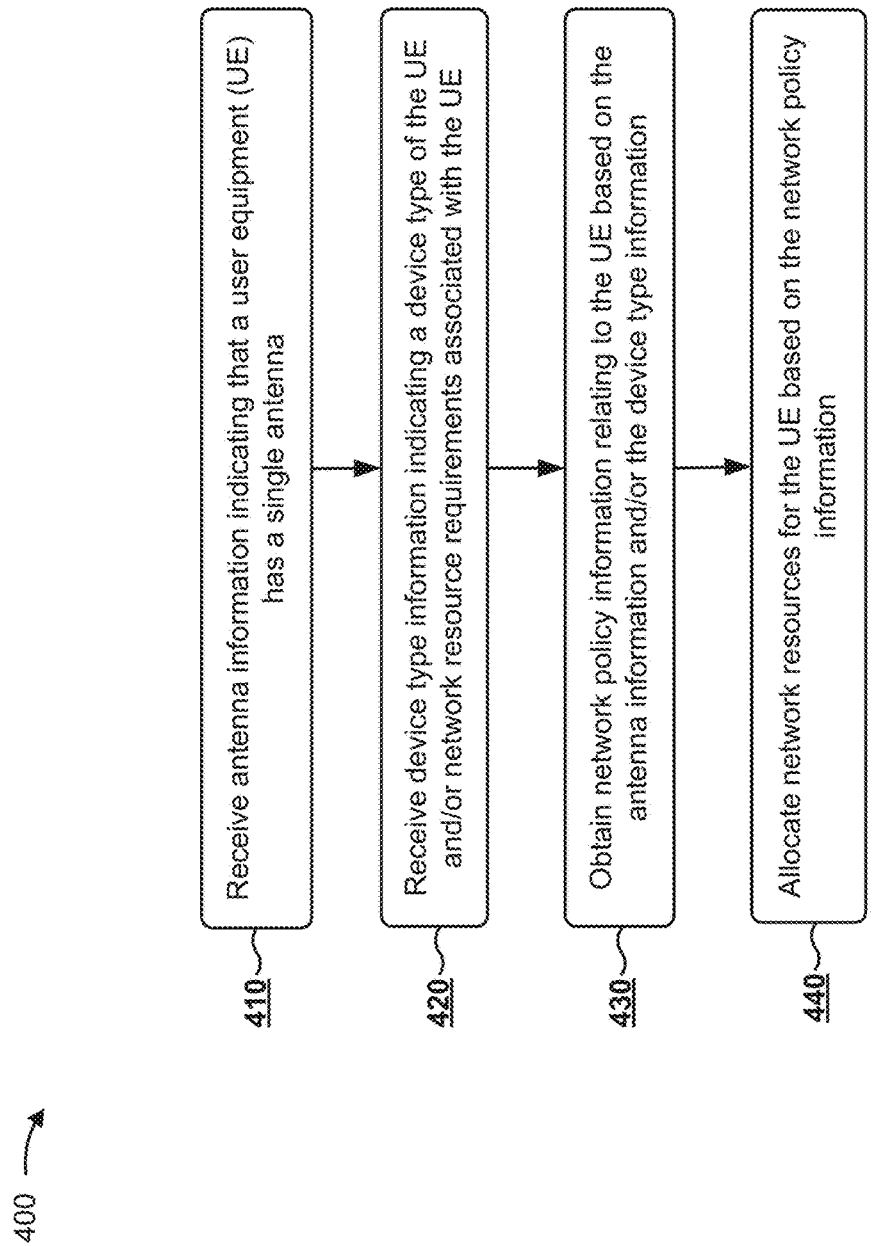
FIG. 4 is a flow chart of an example process for allocating network resources to a device.

FIG. 4 is a flow chart of an example process 400 for allocating network resources to a device. In some implementations, one or more process blocks of FIG. 4 may be performed by base station 210. In some implementations, one or more process blocks of FIG. 4 may be performed by another device or a group of devices separate from or including base station 210, such as UE 205, MME 220, SGW 225, PGW 230, HSS/AAA 235, PCRF 240, or DMD 245.

As shown in FIG. 4, process 400 may include receiving antenna information indicating that a user equipment (UE) has a single antenna (block 410). In some implementations, base station 210 may receive antenna information, from UE 205, indicating that UE 205 includes a single antenna. Additionally, or alternatively, base station 210 may receive antenna information, indicating that UE 205 includes a single antenna, from a network device, such as MME 220, HSS/AAA 235, PCRF 240, or DMD 245.

In some implementations, base station 210 may receive antenna information from UE 205 during or after a connection request. As an example, UE 205 may send antenna information to base station 210, during a connection request, indicating that UE 205 is a single antenna device. During the connection request, UE 205 and base station 210 may participate in a RRC capabilities exchange where UE 205 may send (e.g., as a parameter in the RRC capabilities exchange) antenna information to base station 210. Base station 210 may send the antenna information to another network device (e.g., HSS/AAA 235, PCRF 240, DMD 245, etc.), and the other network device may use the antenna information to create and store policies regarding the allocation of network resources, as described further herein.

In some implementations, base station 210 may receive antenna information from another network device. For example, HSS/AAA 235 and/or DMD 245 may store antenna information and may send the stored antenna information to base station 210. HSS/AAA 235 and/or DMD 245 may store the antenna information in a way that indicates a relationship between a UE identifier (e.g., an IMEI, an international mobile subscriber identity (IMSI), a subscriber identity module (SIM), an integrated circuit card identifier (ICCID), etc.) and antenna information associated with UE 205.

As an example, base station 210 may receive, from HSS/AAA 235, antenna information indicating that UE 205 is a single antenna device. In this case, during or after UE 205 connects to base station 210, UE 205 may send base station 210 a UE identifier, and base station 210 may send the UE identifier to HSS/AAA 235. HSS/AAA 235 may use the UE identifier to access the antenna information (e.g., information indicating that UE 205 is a single antenna device) in a subscriber profile associated with UE 205, and HSS/AAA 235 may send the antenna information to base station 210.

As another example, base station 210 may receive, from DMD 245, antenna information indicating that UE 205 is a single antenna device. In this case, during or after UE 205 connects to base station 210, UE 205 may send base station 210 a UE identifier, and base station 210 may send the UE identifier to HSS/AAA 235. HSS/AAA 235 may use the UE identifier to access antenna information stored by DMD 245. For example, HSS/AAA 235 may use the UE identifier as a search query, and the search query may be used to locate a record, stored by DMD 245, that has a matching UE identifier along with corresponding antenna information (e.g., antenna information indicating that UE 205 is a single antenna device). HSS/AAA 235 may send the antenna information to base station 210. By providing base station 210 with information indicating that UE 205 is a single antenna device, base station 210 is able to make more intelligent network resource allocation decisions, as described further herein.

As further shown in FIG. 4, process 400 may include receiving device type information indicating a device type of the UE and/or network resource requirements associated with the UE (block 420). Device type information may indicate a type of device (e.g., a wearable device, an IoT device, an M2M device, a device with a sensor, an uplink-centric device such as a device that consumes primarily uplink resources, etc.), and/or may indicate network resource requirements associated with UE 205 (e.g., a device application may be associated with a certain range of per day data-byte consumption, an amount of throughput, an amount of latency, an amount of jitter, a level of QoS, etc.). Device type information may be received alone, or in conjunction with, the antenna information described above.

In some implementations, base station 210 may receive, from UE 205, device type information indicating a device type of UE 205. As an example, during a connection request from UE 205, base station 210 may receive device type information indicating that UE 205 is a wearable device. During the connection request, UE 205 and base station 210 may participate in a RRC capabilities exchange where UE 205 may send (e.g., as a parameter in the RRC capabilities exchange) the device type information to base station 210. Base station 210 may send the device type information to another network device (e.g., HSS/AAA 235, PCRF 240, DMD 245, etc.), and the other network device may use the device type information to create and store policies regarding the allocation of network resources, as described further herein.

Additionally, or alternatively, base station 210 may receive, from UE 205, device type information indicating network resource requirements associated with UE 205. As an example, during or after a connection request from UE 205, base station 210 may receive device type information (e.g., UE 205 may be a wearable camera) indicating that the device type of UE 205 is associated with using a low amount of downlink resources per day (e.g., a wearable camera may use a low amount of downlink resources because wearable cameras are used primarily for uplink streaming).

Additionally, or alternatively, base station 210 may receive, from UE 205, a UE identifier, and base station 210 may use the UE identifier to obtain information indicating network resource requirements associated with UE 205. As an example, during or after a connection request from UE 205, base station 210 may receive a UE identifier, and base station 210 may use the UE identifier to obtain information indicating network resource requirements associated with UE 205. In some cases, base station 210 may use the UE identifier as a search query, and the search query may be used to locate a record, stored by a network device (e.g., HSS/AAA 235, DMD 245, etc.), that has a matching UE identifier, along with corresponding information indicating the network resource requirements associated with UE 205. In other cases, base station 210 may use the UE identifier to access a local data structure that stores the UE identifier with corresponding network resource requirements associated with UE 205. Base station 210 may also obtain network resource requirements associated with UE 205 by receiving, from UE 205, information indicating a type of device of UE 205 (e.g., during a connection request), and may access the information in the same manner described above.

In some implementations, base station 210 may receive, from a network device such as HSS/AAA 235 or DMD 245, device type information indicating a device type of UE 205. As an example, a subscriber profile of UE 205 (e.g., stored by HSS/AAA 235) may include information indicating that UE 205 is a wearable device. In this case, when UE 205 sends a UE identifier to base station 210, base station 210 may send the UE identifier to HSS/AAA 235, and HSS/AAA 235 may use the UE identifier to access the information indicating that UE 205 is a wearable device. As another example, the device type information may be stored by DMD 245, and accessed by HSS/AAA 235, as described above.

Additionally, or alternatively, base station 210 may receive, from a network device such as HSS/AAA 235 or DMD 245, device type information that indicates network resource requirements associated with UE 205. As an example, a subscriber profile of UE 205 (e.g., stored by HSS/AAA 235) may include information indicating that UE 205 uses primarily uplink resources (e.g., UE 205 may be a wearable camera used primary for uplink streaming). In this case, when UE 205 sends a UE identifier to base station 210, base station 210 may send the UE identifier to HSS/AAA 235, and HSS/AAA 235 may use the UE identifier to access device type information indicating that UE 205 is a wearable camera that uses primarily uplink resources. As another example, the device type information may be stored by DMD 245 and accessed by HSS/AAA 235, as described above. By providing base station 210 with information indicating the device type and/or the network resource requirements associated with UE 205, base station 210 intelligently allocates network resources.

As further shown in FIG. 4, process 400 may include obtaining network policy information relating to the UE based on the antenna information and/or the device type information (block 430). For example, base station 210 may obtain network policy information relating to UE 205 from one or more network devices (e.g., MME 220, SGW 225, PGW 230, HSS/AAA 235, PCRF 240, and/or DMD 245), and the network policy information may be based on the antenna information and/or the device type information of UE 205. Network policy information may include information indicating one or more policy rules that may be used to allocate network resources to UE 205.

In some implementations, prior to base station 210 obtaining the network policy information, PCRF 240 may use the antenna information and/or the device type information to generate the network policy information. For example, PCRF 240 may access antenna information and/or device type information stored by a network device such as HSS/AAA 235 and/or DMD 245, and PCRF 240 may use the antenna information and/or device type information to generate one or more policy rules that allocate network resources to UE 205. PCRF 240 may generate one or more policy rules, for example, by monitoring the network resources that UEs 205 of a particular device type consume during a given time period. As an example, PCRF 240 may monitor a volume of network traffic that UEs 205 of a particular device type consume during a given time period. In this case, PCRF 240 (or a different network device such as HSS/AAA 235 and/or DMD 245) may store information indicating the network traffic consumed by the UEs 205, during the given time period, with corresponding antenna information and/or device type information. PCRF 240 may send this information to base station 210, and base station 210 may use the one or more policy rules to allocate network resources to UE 205, as described further herein.

In some implementations, PCRF 240 may generate policy rules that indicate a situation where base station 210 may reduce a quantity of network resources available for UE 205 (e.g., a policy rule may indicate a situation where base station 210 may reduce a quantity of uplink resources and/or reduce a quantity of downlink resources, a policy rule may indicate a situation where base station 210 may reduce a quantity of network resources based on a time restriction, a policy rule may indicate a situation where base station 210 may reduce a quantity of network resources based on a device priority level, etc.). Additionally, or alternatively, PCRF 240 may generate policy rules that indicate a situation where base station 210 may increase a quantity of network resources available for UE 205 (e.g., a policy rule may indicate a situation where base station 210 may increase network resources based on one or more QoS parameters, a policy rule may indicate a situation where base station 210 may increase network resources based on a degree of mobility of a device, a policy rule may indicate a situation where base station 210 may increase network resources based on one or more exception conditions, such as a critical condition that requires allocating additional network resources to a device when the critical condition is satisfied, etc).

In some implementations, base station 210 may obtain, from the one or more network devices, network policy information for UE 205 that indicates one or more policy rules. As an example, one or more policy rules may be associated with UE 205 being a single antenna device such as a smart meter. In this case, the one or more policy rules may include a policy rule that reduces a quantity of available network resources during periods of heavy network traffic (e.g., a quantity of network traffic that satisfies a threshold). This policy rule may be created for a device type such as a smart meter because smart meters may be configured to transmit data during set intervals, and changing the transmission interval may be done without any major consequence (e.g., whether a smart meter transmits data at 6:00 PM or 11:00 PM may not matter if a user is not checking the data until the following day). As a result, base station 210 may reduce network resources available to the smart meter during periods of heavy network traffic, thereby conserving overall network resources and maximizing operating efficiency of the network.

As another example, base station 210 may obtain one or more policy rules associated with UE 205 being a single antenna device such as a wearable camera. In this case, the one or more policy rules may include a rule that provides for a reduced quantity of downlink resources, while providing for restriction-free use of uplink resources. This policy rule may be created for a device type such as the wearable camera because wearable cameras are used primarily for uplink streaming. As a result, base station 210 may reduce downlink resources without restricting the uplink resources needed for the wearable camera to stream data.

As another example, base station 210 may obtain policy rules associated with UE 205 being a single antenna device such as a M2M/IoT security system. In this case, the one or more policy rules may include a rule that reduces a quantity of network resources associated with non-VoLTE transmissions, while providing for restriction-free use of VoLTE in case of an emergency (e.g., the security system may need to make a VoLTE call to report a crime). By obtaining policy rules associated with the antenna information and the device type of UE 205, base station 210 is able to make more efficient network resource allocation decisions.

Additionally, or alternatively, PCRF 240 may generate models which are trained using artificial intelligence or machine learning, and the models identify policy rules based on the antenna information and/or the device type information. For example, assume PCRF 240 monitors and stores the antenna information and/or the device type information of UEs 205 that connect to a network (this may be tens, hundreds, or even thousands of UEs 205). PCRF 240 may use the antenna information and/or the device type information to generate models that are able to predict a quantity of resources to allocate to a particular UE 205 based on the network resources used by UEs 205 that share the same number of antennas or that share the same device type.

As an example, PCRF 240 may generate a model using antenna information and/or device type information of UEs 205 that connect to a network (e.g., over a given time period). In this case, the model may, for different groups of UEs 205 (e.g., where a group of UEs 205 is associated with a particular combination of device type information and/or antenna information), include information indicating a range of network resources consumed by the groups of UEs 205. The model may be trained in real-time (e.g., relative to a UE 205 connecting to the network), or PCRF 240 (or another network device such as HSS/AAA 235 and/or DMD 245) may store the model for later use.

As further shown in FIG. 4, process 400 may include allocating network resources for the UE based on the network policy information (block 440). For example, a scheduler of base station 210 may allocate network resources based on the network policy information. The scheduler of base station 210 may allocate network resources for UE 205 by using one or more scheduling algorithms to determine one or more network resource limitations and/or one or more time limitations associated with UE 205 (e.g., a network resource limitation may be a quantity of network resources to allocate to UE 205, and a time limitation may be a time period where UE 205 may use the quantity of network resources). In some implementations, base station 210 may determine the one or more network resource limitations and/or the one or more time limitations for UE 205 by considering the network policy information, the antenna information, and/or the device type information. Additionally, or alternatively, base station 210, when allocating network resources to UE 205, may consider network traffic associated with other UEs 205 and/or priority information associated with other UEs 205.

As an example, base station 210 may receive a request to connect to a network from a single antenna device such as a smart meter. Assume that, at this same time, base station 210 is receiving heavy network traffic from a group of dual antenna devices and/or other single antenna devices. Further assume that the network policy information associated with UE 205 includes a policy rule for allocating a reduced quantity of network resources to the smart meter during periods of heavy network traffic. Due to heavy network traffic, base station 210 may execute a scheduling algorithm that allocates a reduced quantity of network resources to the smart meter based on the policy rule. By reducing the quantity of network resources available for UE 205 during periods of heavy network traffic, base station 210 efficiently allocates network resources in a way that reduces network congestion.

As another example, base station 210 may receive a request to connect to a network from a single antenna device such as a wearable camera. Assume that, at this same time, base station 210 may also be receiving traffic from a group of dual antenna devices and/or single antenna devices. Further assume that the network policy information associated with UE 205 may include a policy rule for allocating a reduced quantity of downlink resources (e.g., due to the wearable camera being used primarily for uplink streaming). Next, base station 210 may execute a scheduling algorithm that allocates a reduced quantity of downlink resources to UE 205 based on the policy rule. By reducing the quantity of network resources available to UE 205, base station 210 frees up additional network resources for other network devices (e.g., such as other UEs 205).

As another example, base station 210 may receive a request to connect to a network from a single antenna device such as a security camera. Assume that, at this same time, base station 210 may also be receiving traffic from a group of dual antenna devices and/or a group of other single antenna devices. Further assume that the network policy information associated with UE 205 may include a policy rule for allocating a reduced quantity of network resources to UE 205 for non-VoLTE transmissions (e.g., without restricting the network resources available for VoLTE transmissions in case the security camera needs to report a crime). Next, base station 210 may execute a scheduling algorithm that allocates a reduced quantity of network resources to UE 205 for non-VoLTE transmissions. By allocating network resources based on antenna information and device type information, base station 210 conserves overall network resources, and improves network resource usage by decreasing dropped calls, reducing handover failures, or the like.

In some implementations, base station 210 may allocate and reallocate network resources for UEs 205 using one or more scheduling algorithms that consider the network resource needs of the UEs 205 during a particular time period (e.g., a period with network congestion, a period without network congestion, etc.). For example, base station 210 may allocate network resources to a group of single antenna UEs 205, and base station 210 may subsequently decrease a quantity of network resources available for the group of single antenna UEs 205 during periods of network congestion. As an example, base station 210 may decrease a quantity of network resources available for a group of single antenna UEs 205 if new devices connect to the network and cause network congestion. By allocating fewer resources to single antenna UEs 205 during a period of network congestion, base station 210 is able to allocate additional network resources to dual antenna UEs 205 that connect to the network, and this may decrease the number of dropped calls and handover failures associated with those devices.

In some implementations, base station 210 may monitor single antenna devices separately from dual antenna devices. In this case, base station 210 may be able to detect technical problems or deficiencies that are specific to single antenna devices and may send information indicating key performance indicators (KPIs) to one or more network devices who may perform preventative and/or restorative actions. In this way, base station 210 makes additional resource-saving decisions based on the network policy information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By providing one or more network devices with antenna information and/or device type information, base station 210 is able to make more intelligent network resource allocation decisions (e.g., by allocating UEs 205 with resources that are comparable to the particular device type of UE 205). In addition, the intelligent network resource scheduling decisions improve user satisfaction and network resource usage by decreasing dropped calls, decreasing handover failures, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      receive a request, from a user equipment (UE), to connect to a network;
      receive antenna information indicating that the UE has a single antenna;
      receive device type information indicating a type of device of the UE,
         the type of device of the UE including one of a plurality of device types, each of the plurality of device types having a single antenna for communicating with the network;
      receive information indicating network resource requirements associated with the type of device of the UE, the network resource requirements indicating:
         uplink resource usage associated with the type of device of the UE, and
         downlink resource usage associated with the type of device of the UE;
      obtain network policy information, relating to the UE, based on the antenna information, the device type information, and the information indicating network resource requirements,
         the network policy information indicating one or more policy rules associated with allocating network resources,
            the one or more policy rules including a first policy rule identifying a limit on data-byte consumption for the UE,
               wherein the limit on data-byte consumption is based on at least one of the uplink resource usage or the downlink resource usage, and
            the one or more policy rules further including at least one of:
               a second policy rule causing a reduction in allocated uplink resources, or
               a third policy rule causing a reduction in allocated downlink resources;
      determine a quantity of network resources to allocate based on the one or more policy rules; and
      allocate the quantity of network resources for the UE.

2. The device of claim 1, where the one or more processors, when receiving the antenna information, are to:

receive the antenna information, from the UE, via a parameter in a radio resource control (RRC) capabilities exchange.

3. The device of claim 1, where the one or more processors, when receiving the device type information, are to:
receive the device type information, from the UE, via a parameter in a radio resource control (RRC) capabilities exchange.

4. The device of claim 1, where the one or more processors, when receiving the antenna information or receiving the device type information, are to:
receive the antenna information or the device type information from a network device.

5. The device of claim 1, where the network policy information includes a policy rule, of the one or more policy rules, identifying a guaranteed bit rate (GBR) to be provided to the UE.

6. The device of claim 1, where the one or more processors, when allocating the quantity of network resources, are to:
reduce a quantity of network resources available for the UE.

7. The device of claim 1, where the one or more processors, when allocating the quantity of network resources for the UE, are to:
reduce a quantity of network resources, available for the UE, to remove a particular quantity from being available to the UE; and
allocate the particular quantity to one or more UEs other than the UE.

8. A non-transitory computer-readable medium storing instructions, the instructions comprising:
one or more instructions that, when executed by one or more processors, cause the one or more processors to:
receive a request, from a user equipment (UE), to connect to a network;
receive antenna information indicating that the UE has a single antenna;
receive device type information indicating a device type of the UE,
the device type of the UE including one of a plurality of device types, each of the plurality of device types having a single antenna for communicating with the network;
receive information indicating network resource requirements associated with the device type of the UE, the network resource requirements indicating:
uplink resource usage associated with the device type of the UE, and
downlink resource usage associated with the device type of the UE;
obtain network policy information based on the antenna information, the device type information, and the information indicating network resource requirements,
the network policy information indicating one or more policy rules associated with allocating network resources,
the one or more policy rules including a first policy rule identifying a limit on data-byte consumption for the UE,
wherein the limit on data-byte consumption is based on at least one of the uplink resource usage or the downlink resource usage, and
the one or more policy rules further including at least one of:

a second policy rule causing a reduction in allocated uplink resources, or
a third policy rule causing a reduction in allocated downlink resources;
determine a quantity of network resources to allocate based on the one or more policy rules; and
allocate the quantity of network resources for the UE.

9. The non-transitory computer-readable medium of claim 8, where the one or more instructions, that cause the one or more processors to receive the antenna information, cause the one or more processors to:
receive the antenna information, from the UE, via a parameter in a radio resources control (RRC) capabilities exchange.

10. The non-transitory computer-readable medium of claim 8, where the one or more instructions, that cause the one or more processors to receive the device type information, cause the one or more processors to:
receive the device type information, from the UE, via a parameter in a radio resources control (RRC) capabilities exchange.

11. The non-transitory computer-readable medium of claim 8, where the one or more instructions, that cause the one or more processors to allocate the quantity of network resources, cause the one or more processors to:
increase a quantity of network resources available for the UE.

12. The non-transitory computer-readable medium of claim 8, where the one or more instructions, that cause the one or more processors to allocate the network resources for the UE, further cause the one or more processors to:
reduce a quantity of network resources available for the UE to remove a particular quantity from being available to the UE; and
allocate the particular quantity to one or more UEs other than the UE.

13. The non-transitory computer-readable medium of claim 8, where the network policy information includes a policy rule, of the one or more policy rules, identifying a guaranteed bit rate (GBR) to be provided to the UE.

14. The non-transitory computer-readable medium of claim 8, where:
the uplink resource usage indicates a first range of per day data-byte consumption, and
the downlink resource usage indicates a second range of per day data-byte consumption.

15. A method, comprising:
receiving, by a device and from a user equipment (UE), a request to connect to a network;
receiving, by the device, antenna information indicating that the UE has a single antenna;
receiving, by the device, device type information indicating a device type of the UE,
the device type of the UE including one of a plurality of device types, each of the plurality of device types having a single antenna for communicating with the network;
receiving, by the device, information indicating network resource requirements associated with the device type of the UE, the network resource requirements indicating:
uplink resource usage associated with the device type of the UE, and
downlink resource usage associated with the device type of the UE;
obtaining, by the device, network policy information, relating to the UE, based on the antenna information, the device type information, and the information indicating network resource requirements, the network policy information indicating one or more policy rules associated with allocating network resources, the one or more policy rules including a first policy rule identifying a limit on data-byte consumption for the UE, wherein the limit on data-byte consumption is based on at least one of the uplink resource usage or the downlink resource usage, and the one or more policy rules further including at least one of:

a second policy rule causing a reduction in allocated uplink resources, or a third policy rule causing a reduction in allocated downlink resources;

determining, by the device, a quantity of network resources to allocate based on the one or more policy rules; and allocating, by the device, the quantity of network resources for the UE.

16. The method of claim 15, where receiving the antenna information and receiving the device type information comprise:

receiving the antenna information and the device type information, from the UE, via one or more parameters in a radio resource control (RRC) capabilities exchange.

17. The method of claim 15, where receiving the antenna information and receiving the device type information comprise:

receiving the antenna information and the device type information from a network device.

18. The method of claim 15, where the network policy information includes a policy rule, of the one or more policy rules, identifying an amount of network resource throughput for the UE.

19. The method of claim 15, where determining the quantity of network resources to allocate comprises:

determining a quantity of network resources, for the UE, based on one or more models that are trained using artificial intelligence or machine learning.

20. The method of claim 15, where allocating the quantity of network resources for the UE further comprises:

reducing a quantity of network resources available for the UE to remove a particular quantity from being available for the UE; and allocating the particular quantity to one or more UEs other than the UE.

* * * * *